US012505436B2

(12) United States Patent
Enneking

(10) Patent No.: US 12,505,436 B2
(45) Date of Patent: Dec. 23, 2025

(54) TOKENIZATION OF THE APPRECIATION OF ASSETS

(71) Applicant: Timothy J. Enneking, La jolla, CA (US)

(72) Inventor: Timothy J. Enneking, La jolla, CA (US)

(73) Assignee: Timothy J. Enneking, La Jolla, CA (US)

( * ) Notice: Subject to any disclaimer, the term of this patent is extended or adjusted under 35 U.S.C. 154(b) by 407 days.

(21) Appl. No.: 17/644,505

(22) Filed: Dec. 15, 2021

(65) Prior Publication Data

US 2023/0186301 A1 Jun. 15, 2023

(51) Int. Cl.
*G06Q 20/38* (2012.01)
*G06Q 20/06* (2012.01)
*G06Q 20/36* (2012.01)

(52) U.S. Cl.
CPC ....... *G06Q 20/389* (2013.01); *G06Q 20/0658* (2013.01); *G06Q 20/36* (2013.01)

(58) Field of Classification Search
None
See application file for complete search history.

(56) References Cited

U.S. PATENT DOCUMENTS

| | | | |
|---|---|---|---|
| 2018/0218176 A1* | 8/2018 | Voorhees | G06Q 20/02 |
| 2019/0080392 A1* | 3/2019 | Youb et al. | G06Q 20/065 |
| 2019/0114706 A1* | 4/2019 | Bell | G06Q 40/03 |
| 2019/0129895 A1* | 5/2019 | Middleton | G06F 16/2379 |
| 2019/0244298 A1 | 8/2019 | Doney | |
| 2020/0042989 A1 | 2/2020 | Ramadoss et al. | |
| 2020/0051166 A1 | 2/2020 | Loh et al. | |
| 2020/0193516 A9 | 6/2020 | de Jong et al. | |
| 2020/0250168 A1* | 8/2020 | Xu | G06F 16/2336 |
| 2020/0342539 A1 | 10/2020 | Doney | |
| 2020/0360820 A1 | 11/2020 | Cunningham et al. | |
| 2021/0006478 A1* | 1/2021 | Levitt | H04L 41/5006 |
| 2021/0133700 A1* | 5/2021 | Williams | G06Q 20/3829 |
| 2022/0067715 A1* | 3/2022 | Deng | H04L 9/50 |

FOREIGN PATENT DOCUMENTS

WO 2020072069 A1 4/2020

OTHER PUBLICATIONS https://masterthe crypto.com/guid-etherdelta-exchange-trade-etherdelta/; Wayback Machine access Nov. 9, 2020 (Year: 2020).*
Pasdar, Amirmohammad, Zhongli Dong, and Young Choon Lee. "Blockchain oracle design patterns." arXiv preprint arXiv: 2106.09349 (2021). (Year: 2021).*
https://blockonomi.com/chainlink-guide/, Oliver Dale, What is Chainlink?Guide to . . . Oracle; Oct. 8, 2019 (Year: 2019).*
https://7664816.hs-sites.com/micobo-dit-blog/10-assets-that-can-be-tokenized (last accessed Dec. 10, 2021).

* cited by examiner

*Primary Examiner* — Slade E Smith
(74) *Attorney, Agent, or Firm* — KLEMCHUK PLLC

(57) ABSTRACT

Disclosed are methods and systems that tokenize the appreciation of an asset. An appreciation token that corresponds to the value of the appreciation of the asset can be generated, and a smart contract can be embedded into a distributed ledger block of a distributed ledger.

6 Claims, 1 Drawing Sheet

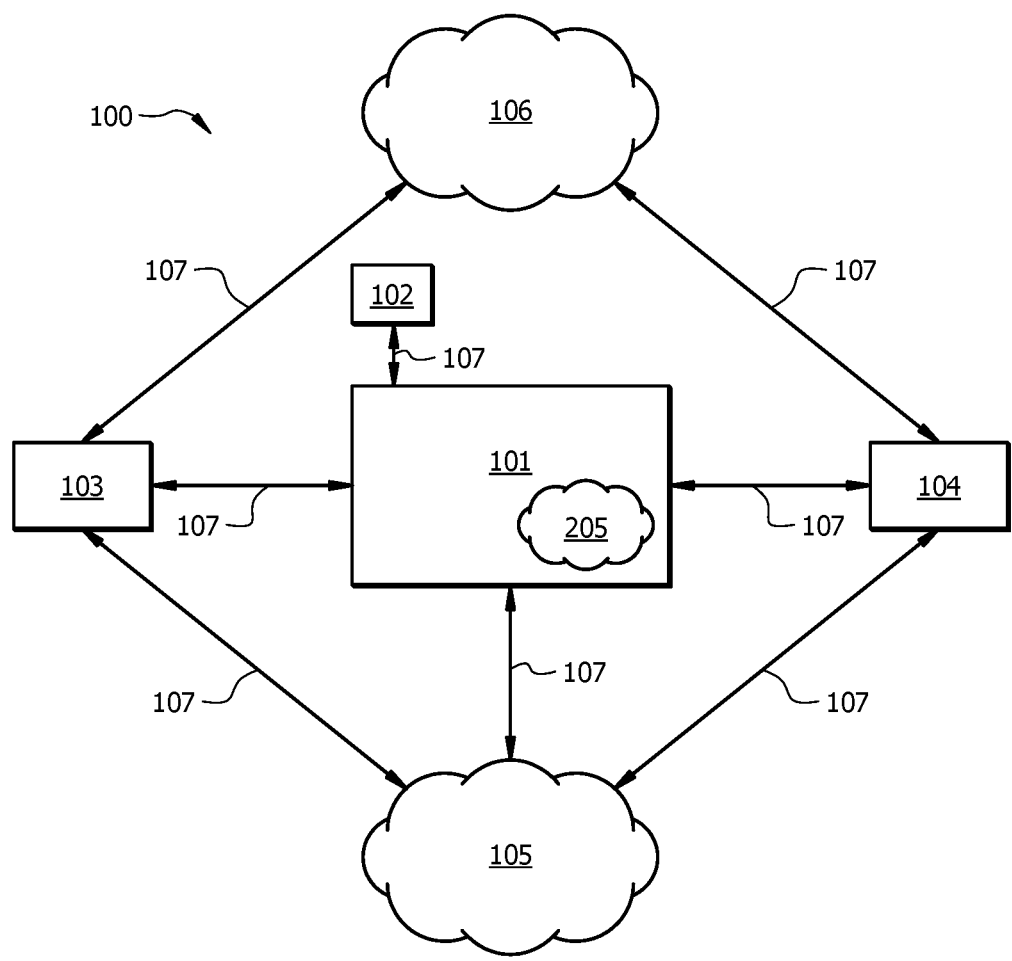

TOKENIZATION OF THE APPRECIATION OF ASSETS

FIELD OF THE DISCLOSURE

The present disclosure generally relates to tokenization of the appreciation of assets and transactions for the transfer of appreciation tokens.

BACKGROUND

Utilization of distributed ledgers for contract documentation in a transaction context is rising in popularity. Various distributed ledgers offer documentation capabilities in a transaction on the ledger. For example, Ethereum and Bitcoin are distributed ledgers which can accommodate smart contracts. Some distributed ledgers provide tokenization of assets. Adoption of distributed ledgers in various new applications, and using distributed ledgers in new ways, is an ongoing activity.

SUMMARY

Disclosed is a method that can include generating an appreciation token corresponding to the value of the appreciation of the asset; and embedding or instructing a distributed ledger to embed, a smart contract into a distributed ledger block of the distributed ledger, wherein the smart contract contains terms for redeeming at least a portion of the appreciation token.

Also disclosed is an appreciation token platform having one or more processors and a memory containing instructions that cause the one or more processors generating an appreciation token corresponding to the value of the appreciation of the asset; and embed or instruct a distributed ledger to embed, a smart contract into a distributed ledger block of the distributed ledger, wherein the smart contract contains terms for redeeming at least a portion of the appreciation token.

BRIEF DESCRIPTION OF THE DRAWINGS

For a more complete understanding of this disclosure, reference is now made to the following description, taken in conjunction with the accompanying drawings, in which:

The FIG. 1s a schematic diagram of an appreciation token environment according to this disclosure.

DETAILED DESCRIPTION

"Asset" as used herein can be any tangible or intangible medium of value, including, but not limited to, any collectible such as art or coins, virtual coins and tokens (e.g., Bitcoin), shares of stock, bonds, options, derivatives, indices, ETFs, funds, all other types of securities (lock up), oil, oil rights, minerals, mineral rights, mining rights, water rights, future payments, including debts, mortgages, loans, tax refunds, real property (land and improvements), trips to the moon, trips to Mars, trips to space, wine, precious metals, any commodity, personal net worth (e.g., the future net worth of a sports figure, movie star, politician, entrepreneur, average Joe), and bets of all types: sports races, political results, weather.

"Token" as used herein refers to a cryptocurrency.

"Appreciation", "appreciation value", "value of appreciation", and "future appreciation" as used herein refer to the difference between the initial value of an asset and the value upon sale of the asset, e.g., the increase in value of the asset between a time of purchase and a time of sale of the asset.

"Appreciation token" as used herein refers to a cryptocurrency into which the right or contract to receive payment for the appreciation of an asset, in exchange for paying for the token. The appreciation tokens disclosed herein represent the change in value of the underlying asset, not the underlying asset itself.

The term "blockchain" is a distributed ledger that keeps a continuously growing list of data records. Each data record is protected against tampering and revisions. Blockchains are used with public ledgers of transactions, where the record is enforced cryptographically. The term blockchain covers a public or private ledger of all transactions of a blockchain-based cryptocurrency.

The terms "comprises" and "comprising", when used in this specification, specify the presence of stated features, steps, operations, elements, components, or combinations thereof, but do not preclude the presence or addition of one or more other features, steps, operations, elements, components, or combinations thereof.

The term "smart contract" as used herein refers to a software code that contains a contract that affects the state of an appreciation token in terms of its value and ownership. In aspects disclosed herein, a smart contract can be encrypted and digitally signed by the asset owner.

This disclosure involves the tokenization of all or a part of the appreciation of an asset. The asset for which the appreciation is tokenized will have been previously purchased by the asset owner. In aspects, the ownership of the asset can be securitized; alternatively, the ownership is not securitized. In aspects of a securitized asset, the asset securities may be listed on an exchange; alternatively, the asset securities may not be listed on an exchange. Generally, the appreciation tokens disclosed herein are not locked to the underlying asset or to any securities representing the asset; thus, the appreciation tokens can be bought and sold independently of any securities for the asset.

An asset owner can interact with the disclosed appreciation token platform to document an initial value for an asset owned by the asset owner. The initial value can be documented by the appreciation token platform and in a database of the platform, in an external blockchain ledger, in a blockchain ledger that is internally managed on the platform, or a combination thereof. In one example, the initial value of the asset can be documented by the seller uploading description and supporting documents such as the debt agreement, the loan terms, payment history, debtor information, and the list price for the asset.

The appreciation token platform can receive some sort of consideration in exchange for creating the appreciation tokens for the asset.

In one example, the owner of the asset (the asset owner) can give consideration (e.g., pay a fee, pay a commission on the sale of tokens, grant a lien on the asset) to a tokenizing entity (e.g., having an appreciation token platform disclosed herein) to secure the appreciation tokens, in exchange for the tokenizing entity issuing to the owner of the asset the appreciation tokens that represent the appreciation of the asset. The owner of the asset (asset owner) can utilize the appreciation token platform to sell one or more appreciation tokens representing the future appreciation of the asset to a buyer (contract holder). By selling one or more appreciation tokens to a buyer, a future payment obligation is imposed on the asset owner to make a future appreciation payment to the contract holder, wherein the future appreciation payment represents the appreciation of the asset at a future time.

Alternatively, the tokenizing entity (e.g., having the appreciation token platform disclosed herein) can obtain initial payments from buyers for an initial value of the appreciation tokens, hold the payments in escrow until a predefined condition is met, instruct a distributed ledger to embed a smart contract into a distributed ledger block of the blockchain, wherein an ownership interest in the name of the buyers is part of the terms of the smart contract.

After receiving some sort of consideration for creation of one or more appreciation tokens that represent the appreciation of the asset, the appreciation token platform can generate one or a plurality of appreciation tokens that correspond to the value of the appreciation of the asset. In some aspects, the appreciation token platform disclosed herein is configured to instruct a distributed ledger to embed a smart contract into a distributed ledger block of the distributed ledger, where each smart contract has one or more obligations (e.g., non-regulated investment terms, security interest terms) that relate to the appreciation of the asset over time. The value of an appreciation token does not necessarily reflect the value of the appreciation of the asset, and instead, the value of the appreciation token is the value that an investor is willing to pay for the appreciation token for the asset, based on an expected appreciation of the asset over a period of time (e.g., 1 day, 1 month, 1 year, or all future time). The period of time can be predefined intervals of time where asset value is determined and any appreciated is calculated based on the initial value; alternatively, the period of time can be defined by a first point in time that the asset is documented with an initial value by the platform and a second point in time that the asset is sold by the asset owner.

Smart contract terms embedded in a distributed ledger block as disclosed herein can include: 1) when the asset is sold for a value that is higher than the initial value, instructions that the appreciation token values are distributed to the appreciation token holders (e.g., a buyer or subsequent transferee of the buyer, or subsequent transferee of a subsequent transferee), 2) when the asset is sold for a value that is lower than the initial value, instructions that the appreciation tokens have a value of zero, 3) instructions that an appreciation token cannot have a negative value, 4) an account identifier, such as an encrypted key for the buyer (e.g., the account identifier may be a unique value used by the appreciation token platform for identification of a transaction account number, a wallet identifier, a device identifier, a username, an e-mail address, a phone number, or a combination thereof); or 5) a combination thereof.

The FIGURE illustrates a system 100 for conducting digital transactions for the transfer of a portion of an appreciation token, one or more appreciation tokens, or a combination thereof, from an electronic wallet of a seller to an electronic wallet of a buyer. The system 100 can include an appreciation token platform 101 that interacts with one or more of an asset owner computer device 102, a seller computer device 103, a buyer computer device 104, an external blockchain system 105, and a payment processing system 106 via communication connections 107 (e.g., any combination of communication networks) to accomplish the transactions contemplated herein.

Each of the appreciation token platform 101, the asset owner computer device 102, the seller computer device 103, the buyer computer device 104, the external blockchain system 105, and the payment processing system 106 can be embodied as one or more computers having one or more one or more processors, memory having instructions stored thereof, networking cards, and other equipment for processing data (e.g., sending/receiving messages containing data).

The appreciation token platform 101 can be embodied as one or more computers in a local area network (LAN), a wide area network (WAN), a cloud computing environment, or a combination thereof. The appreciation token platform 101 is configured to interact with the asset owner computer device 102 to form a contract with an asset owner and to generate or create appreciation tokens for the asset(s) owned by the asset owner, in exchange for a fee or other consideration for the seller to use the appreciation token platform 101.

The asset owner computer device 102 can include a smart phone, a tablet, a personal computer (e.g., desktop or laptop), a mobile phone, a video phone, an e-book reader, a personal digital assistant (PDA), or a combination thereof.

The seller computer device 103 can include a smart phone, a tablet, a personal computer (e.g., desktop or laptop), a mobile phone, a video phone, an e-book reader, a personal digital assistant (PDA), or a combination thereof.

The buyer computer device 104 can include a smart phone, a tablet, a personal computer (e.g., desktop or laptop), a mobile phone, a video phone, an e-book reader, a personal digital assistant (PDA), or a combination thereof.

The external blockchain system 105 is external of the appreciation token platform 101 and can include one or more computing devices that are networked to one another via any combination of networks (e.g., Internet, mobile, Wi-Fi, LAN, WAN, or any combination thereof).

In some aspects, embodiments of the appreciation token platform 101 contemplate that there is a blockchain system 205 administered internally of the appreciation token platform 101, as will be described in more detail below.

In the system 100, an appreciation token transaction may occur between the seller computer device 103 of an appreciation token seller and the buyer computer device 104 of an appreciation token buyer using the appreciation token platform 101. In some aspects, the appreciation token seller can list, using the seller computer device 103, the availability of one or more appreciation tokens, or portions thereof, on the appreciation token platform 101. The appreciation token buyer can search, using the buyer computer device 104, for appreciation tokens that are listed on the appreciation token platform 101. Purchase of the appreciation token can be made via the blockchain system 105 or a payment processing system 106, such that payment is transferred from a cryptocurrency account of the buyer via the blockchain system 105 to a cryptocurrency account of the seller or such that payment is transferred from a bank account of the buyer via the payment processing system 106 to a bank account of the buyer.

The appreciation token platform 101 can be configured to authorize the sale of an appreciation token using the blockchain system 105 or the payment processing system 106. In some aspects, the appreciation token platform 101 may be configured to have privately verified identities including blockchain transaction accounts included in the smart contract that is embedded into the block of the distributed ledger.

The asset owner computer device 102 can be configured to send a request to the appreciation token platform 101, the request being for tokenization of the appreciation of an asset owned by the asset owner. The appreciation token platform 101 can receive the request from the asset owner computer device 102 and analyze the request. To analyze the request, the appreciation token platform 101 can be configured to verify the existence of the asset to confirm the asset exists.

Verifying the existence of the asset can include communicating with public or private asset ownership databases to confirm existence of the asset. Upon determining that the asset exists, and that the appreciation of the asset is eligible for tokenization, the appreciation token platform 101 can send a verification message to the asset owner computer device 102 that appreciation of the asset can be tokenized. The appreciation token platform 101 and the asset owner computer device 102 can communicate to determine an initial value for the asset owned by the asset owner. The initial value can be documented by the appreciation token platform 101 and in a database of the appreciation token platform 101. Additionally or alternatively, the appreciation token platform 101 can store the initial value in an external blockchain system 105, in a blockchain ledger 205 that is internally managed on the appreciation token platform 101, or a combination thereof. In one example, the initial value of the asset can be documented by the appreciation token platform 101 receiving a description and supporting documentation such as the debt agreement, the loan terms, payment history, debtor information, and the list price for the asset (e.g., received from the asset owner computer device 102, received or retrieved from a database, or both).

The appreciation token platform 101 can then be configured to generate a token representing the appreciation of the asset and assign the initial value to the token. In embodiments, the appreciation token can be embodied as a data structure in a smart contract that is embedded into a block of a distributed ledger in the internal blockchain system 205 or external blockchain system 105.

In embodiments, the asset owner computer device 102 can be the seller computer device 103; while in other embodiments, the seller computer device 103 can be a device of a previous buyer of all or a portion of the appreciation token.

In aspects, the seller computer device 103 can be associated with various seller accounts including one or more fiat currency transaction accounts, one or more blockchain cryptocurrency transaction accounts (cryptocurrency wallet is used interchangeably herein with cryptocurrency transaction account), one or more combined currency transaction accounts, or any combination thereof.

In aspects, the seller computer device 103 can be associated with an electronic wallet having cryptocurrency therein for blockchain transactions.

When selling appreciation tokens on the appreciation token platform 101, the seller computer device 103 can instruct the appreciation token platform 101 which forms of payment processing (e.g., via system 105 or system 106) can be used for selling an appreciation token.

The buyer computer device 104 can be associated with various buyer accounts including one or more fiat currency transaction accounts, one or more blockchain cryptocurrency transaction accounts (cryptocurrency wallet is used interchangeably herein with cryptocurrency transaction account), one or more combined currency transaction accounts, or any combination thereof.

In aspects, the buyer computer device 104 can be associated with an electronic wallet having cryptocurrency therein for blockchain transactions. The electronic wallet providers of the seller and buyer can be the same or different.

When buying appreciation tokens on the appreciation token platform 101, the buyer computer device 104 can request to pay for the appreciation token via payment processing system 106 or blockchain system 105.

Payment processing for the appreciation token can be accomplished by the external blockchain system 105, a traditional payment processing system 106, or both the blockchain system 105 and payment processing system 106.

The external blockchain system 105 can administer and maintain a blockchain to verify, facilitate, and record various transactions, includes those facilitated by the appreciation token platform 101 for appreciation token payment transaction. The distributed nature of the blockchain over multiple nodes in the network together with a suitable form of timestamping (e.g., proof-of-work) ensures the security and authenticity of the database. Each unit of cryptocurrency (e.g., each Bitcoin or fraction of Bitcoin) is assigned to a public cryptocurrency address that is recorded in the blockchain, wherein the unit of currency may be transferred out of the public address (e.g., to another public address) using a private cryptocurrency key held by the current "owner" of the unit. In addition, the current balance of any particular public cryptocurrency address may be checked by any entity by executing a query of the blockchain database. In some embodiments, the external blockchain system 105 includes a known blockchain platform, such as Ethereum. Ethereum is a platform that allows people to easily write decentralized applications using blockchain technology. A decentralized application is an application which serves some specific purpose to its users, but which has the important property that the application itself does not depend on any specific party existing. The Ethereum blockchain can be alternately described as a blockchain with a built-in programming language, or as a consensus-based globally executed virtual machine. The part of the protocol that can perform internal state and computation can be a virtual machine (VM). From a practical standpoint, the VM can be thought of as a large and decentralized computer containing millions of objects, called "accounts", which have the ability to maintain an internal database, execute code, and communicate with one another.

The external blockchain system 105 can include one or more computing devices. The one or more computing devices that form the external blockchain system 105 can be configured to process and record the appreciation token transactions as part of a block in the blockchain. Once a block is completed, the block is added to the blockchain, and the transaction record is updated. In many instances, the blockchain may be a ledger of transactions in chronological order, or may be presented in any other order that may be suitable for use by the external blockchain system 105. In some configurations, the appreciation token transactions recorded in the blockchain may include a destination address and a currency amount, such that the blockchain records how much currency is attributable to a specific address. In some aspects, additional information may be captured, such as a source address, timestamp, or a combination thereof.

The payment processing system 106 can be embodied as one or more computers that exist in known payment processing networks. For example, the payment processing system 106 can include computer devices configured for well-known batch processing, in a store-and-forward system commonly referred to as the ACH network. An exemplary ACH process can include the payment processing computing equipment of additional entities including, but not limited to, an originating depository financial institution (ODFI) associated with the seller, a central clearing facility, and a receiving depository financial institution (RDFI) association with the buyer. The ODFI can be the appreciation token seller's financial institution that receives formatted payment instructions from the seller corresponding to the transaction request. In this regard, the appreciation token platform 101 does not directly transmit the appreciation token transaction request to the ODFI. For example, the seller computer device 103 passes the appreciation token transaction request into the payment processing system 106. The transaction request may pass through a switch or proceed directly to the ODFI. The ODFI can send a payment request message to an ACH operator, for example, a federal reserve bank. Using the received instructions, the ACH operator can identify the buyer's RDFI. The ACH operator then can transmit the payment information to the identified RDFI. The identified RDFI (the buyer's RDFI) can receive the payment information and processes the payment information. If funds are available, the seller's ODFI may receive the funds from the buyer's RDFI on a settlement date. The foregoing is a highly simplified description of an ACH processing; however, ACH processing systems are known in the art.

In some aspects, the appreciation token platform 101 can include an internal blockchain system 205. The blockchain system 205 can administer and maintain a blockchain to verify, facilitate, and record various transactions, includes those facilitated by the appreciation token platform 101 for appreciation token payment transaction. The distributed nature of the blockchain over multiple nodes in the appreciation token platform 101 together with a suitable form of timestamping (e.g., proof-of-work) ensures the security and authenticity of the appreciation token platform 101. Each block of the internal blockchain can be assigned to a private cryptocurrency address that is recorded in the blockchain, wherein the location may be communicated to the seller and buyer using a private cryptocurrency key held by the seller computer device 103 or the buyer computer device 104. In addition, the current balance of any particular private block address may be checked by executing a query of the blockchain database. In some embodiments, the blockchain system 205 is a decentralized application.

The blockchain system 205 can be implemented on include one or more computing devices (nodes) of the appreciation token platform 101. The one or more computing devices that form the blockchain system 205 can be configured to process and record the appreciation token transactions as part of a block in the blockchain. Once a block is completed, the block is added to the blockchain, and the transaction record is updated. In many instances, the blockchain may be a ledger of transactions in chronological order, or may be presented in any other order that may be suitable for use by the blockchain system. In some configurations, the appreciation token transactions recorded in the blockchain may include a destination address and a currency amount, such that the blockchain records how much currency is attributable to a specific address. In some aspects, additional information may be captured, such as a source address, timestamp, or a combination thereof.

The below discussion will be in context of an entire appreciation token; however, it is contemplated that the discussion can apply to transactions for a portion or fraction of an appreciation token.

The appreciation token platform 101 can be configured to display appreciation tokens for sale on a website administered by the appreciation token platform 101 or a third party. The appreciation token platform 101 can receive a request to sell an appreciation token associated with a seller computer device 103, from the seller computer device 103. Alternatively, the appreciation token platform 101 can receive a request to buy an appreciation token associated with a seller computer device 103 from a buyer computer device 104. The appreciation token platform 101 can communicate with the seller computer device 103 and buyer computer device 104 to determine a price for the appreciation token.

The appreciation token platform 101 can be configured to receive identifier information (e.g., bank account, routing number, cryptocurrency account identifier) from the seller via the seller computer device 103 and the buyer via the buyer computer device 104.

Upon agreement for transaction between the seller computer device 103 and the buyer computer device 104, the appreciation token platform 101 can conduct a transaction for sale of the appreciation token from the seller to the buyer. For example, the appreciation token platform 101 may conduct a blockchain transaction. As part of the blockchain transaction, the appreciation token platform 101 may generate a destination address for receipt of payment of cryptocurrency (previously provided to the appreciation token platform 101 by the buyer computer device 104). The destination address may be generated using an encryption key stored in the computing device of the buyer computer device 104. The encryption key may be part of a key pair, such as a public key corresponding to a private key stored in the computing device. In some aspects, the buyer computer device 104 may provide the public key to the seller computer device 103, and the seller computer device 103 may generate the destination address. A transaction request may then be submitted by the seller computer device 103 to the appreciation token platform 101 for payment of an agreed-upon cryptocurrency amount to the destination address provided by the buyer computer device 104.

In embodiments, the appreciation token platform 101 can be configured to send a transaction request to the external blockchain system 105; alternatively, the appreciation token platform 101 can be configured to send the transaction request to the payment processing system 106. The transaction request sent by the appreciation token platform 101 can include the bank account, routing number, cryptocurrency identifier, or combinations thereof, for each of the seller and the buyer.

In embodiments which utilize the external blockchain system 105, the transaction amount may be an amount of blockchain cryptocurrency being transferred as a result of the transaction. The address identifier may be the destination address for the blockchain cryptocurrency, as provided by the buyer computer device 104 or generated by the seller computer device 103 using information provided by the buyer computer device 104 (e.g., their public key). In instances where the data element includes a public key (e.g., associated with the buyer computer device 104) instead of an address identifier, the payment processing system 106 may be configured to generate an address identifier using the public key. In some aspects, the address identifier may be encoded using encoding algorithms, such as the Base58Check algorithm.

In embodiments, the external blockchain system 105 may receive the transaction request from the appreciation token platform 101 and an amount of blockchain cryptocurrency and may process the transaction by generating a block that is added to a blockchain that includes a record for the transaction.

In some embodiments, the appreciation token platform 101 may be further configured to store (e.g., in a datastore of the appreciation token platform 101) private keys on behalf of the seller computer device 103, the buyer computer device 104, or both seller computer device 103 and buyer computer device 104. In such embodiments, the appreciation token platform 101 can initiate a blockchain transaction on behalf of the seller computer device 103 and the buyer computer device 104. For example, the appreciation token platform 101 can store the private key on behalf of the seller computer device 103 and any transaction identifiers associated with the seller computer device 103 (e.g., in their blockchain cryptocurrency account) and may be configured to generate the digital signature and include the generated signature and transaction identifier in transaction messages for blockchain transactions involving the seller computer device 103.

In some embodiments, the appreciation token platform 101 may be further configured to link blockchain transactions with privately verified identities, such as with the seller computer device 103, the buyer computer device 104, or transaction accounts associated therewith. For example, the appreciation token platform 101 may store account information for transaction accounts associated with the seller computer device 103 and the buyer computer device 104 (e.g., held by the acquirer 114), which may include address identifiers. The appreciation token platform 101 may then associate blockchain transactions with the stored account information using the account identifiers included therein and account identifiers included in data elements in received transaction messages. The appreciation token platform 101 may thereby store historical transaction data for individuals for blockchain transactions.

In embodiments, the transfer of ownership of the appreciation token involves transfer of cryptocurrency from a buyer cryptocurrency account to a seller cryptocurrency account. The transfer of cryptocurrency can be initiated by activation of the smart contract that was previously embedded in a block of a blockchain (distributed ledger).

In embodiments where the smart contract is embedded in the private blockchain system 205, the blockchain system 205 can activate the smart contract upon receiving, by the blockchain system 205, the transaction request from the appreciation token platform 101. In embodiments, the block on the blockchain system 205 can further include (previously embedded by the appreciation token platform 101) an oracle (e.g., a set of instructions specifically purposed to gather data externally of the private blockchain system 205) that is configured to contact the cryptocurrency wallet platforms associated with the buyer and seller in order to transfer cryptocurrency from the buyer's cryptocurrency wallet to the seller's cryptocurrency wallet. The cryptocurrency wallets can utilize the external blockchain system 105 to transfer value from the buyer cryptocurrency wallet to the seller cryptocurrency wallet. The oracle can be configured to confirm that the seller's cryptocurrency wallet has been credited with cryptocurrency of the agreed amount, and the oracle can be configured to notify the internal blockchain system 205 of the transfer of the cryptocurrency. The internal blockchain system 205, upon notification of cryptocurrency transfer to the seller's account (upon notification of cryptocurrency transfer completion), can then associate the appreciation token with the buyer computer device 104 and store the association on the appreciation token platform 101.

In embodiments, where the smart contract is embedded in the external blockchain system 105, the external blockchain system 105 can activate the smart contract upon receiving, by the external blockchain system 105, the transaction request from the appreciation token platform 101. In embodiments, the block on the external blockchain system 105 can further include (previously embedded by the appreciation token platform 101) an oracle (e.g., a set of instructions specifically purposed to gather data from platforms on the external blockchain system 105 that administer cryptocurrency wallets) that is configured to contact the cryptocurrency wallet platforms associated with the buyer and seller in order to transfer cryptocurrency from the buyer's cryptocurrency wallet to the seller's cryptocurrency wallet. The transfer can occur among computer devices contained within the external blockchain system 105 to transfer value from the buyer cryptocurrency wallet to the seller cryptocurrency wallet. The oracle can be configured to confirm that the seller's cryptocurrency wallet has been credited with cryptocurrency of the agreed amount, and the oracle can be configured to notify the appreciation token platform 101 of the transfer of the cryptocurrency. The appreciation token platform 101, upon notification of cryptocurrency transfer to the seller's account (of notification of cryptocurrency transfer completion), can then associate the appreciation token with the buyer computer device 104 and store the association on the appreciation token platform 101.

Also disclosed herein are embodiments of a method for tokenizing the appreciation of an asset and a method for transfer of the ownership of the appreciation token from a seller to a buyer. Embodiments of the method can generally include any functionality discussed herein above for the system 100, e.g., for the appreciation token platform 101 interaction with any components (e.g., the asset owner computer device 102, the seller computer device 103, the buyer computer device 104, payment processing system 106, external blockchain system 105). For example, the method can include generating an appreciation token corresponding to a value of the appreciation of the asset; and embedding or instructing a distributed ledger to embed, a smart contract into a distributed ledger block of the distributed ledger, wherein the smart contract contains terms for redeeming at least a portion of the appreciation token. The terms can include any terms disclosed herein, including asset description, appreciation determination, appreciation calculation, payment and timing, or a combination thereof.

In embodiments, the distributed ledger block can be part of a blockchain, and the steps of generating and embedding are performed by an appreciation token platform. The blockchain can be part of a blockchain system that is internal of or external of the appreciation token platform.

In embodiments where the blockchain system is internal of the appreciation token platform, the method can include sending a first transaction request for purchase of the appreciation token to an internal blockchain system; sending, by the internal blockchain system to an external blockchain system, a second transaction request for transfer of cryptocurrency from a first cryptocurrency wallet to a second cryptocurrency wallet; and receiving, by the internal blockchain system, a notification of cryptocurrency transfer. In these embodiments, an oracle embedded in the distributed ledger block can be activated and configured to send the notification of cryptocurrency transfer to the internal blockchain system.

In embodiments where the blockchain system is external of the appreciation token platform, the method can include sending, by an appreciation token platform, a transaction request for transfer of cryptocurrency from a first cryptocurrency wallet to a second cryptocurrency wallet to the external blockchain system; and receiving, by the appreciation token platform, a notification of cryptocurrency transfer. In these embodiments, an oracle embedded in the distributed ledger block can be activated and configured to send the notification of cryptocurrency transfer to the appreciation token system.

The method and system disclosed herein accordingly provide for the processing of appreciation token transactions, flexibly using either traditional payment processing system 106 and/or external blockchain system 105.

Embodiments of the methods and systems disclosed herein can utilize the disclosed internal blockchain system 205 for embedding smart contracts containing terms for the appreciation tokens, in combination with external payment processing via external blockchain system 105 and/or system 106. The method and systems are thus dual-layered, in that, the internal system 205 shields the information for the appreciation token transaction from public display since it is internally located in the appreciation token platform 101, while the appreciation token platform 101 can accommodate payments through external blockchain system 105 and/or payment processing system 106.

Transaction processing speed is enhanced when using the internal blockchain system 205 for embedding the smart contracts because the appreciation token platform 101 does not depend on myriad nodes to reach a consensus for adding a block, and the appreciation token platform 101 only depends on the finite number of nodes in the appreciation token platform 101 and as such, the appreciation token platform 101 process the creation of a block containing the smart contract faster than the external blockchain system 105 (which is public) because fewer nodes are required for consensus in the appreciation token platform 101.

Moreover, use of the oracle for cryptocurrency transfer shields the internal blockchain system 205 and appreciation token platform 101 from direct interaction with the external blockchain system 105, providing an added layer of cybersecurity.

Other advantages of the method and system may include one or more of the following. The methods and systems allow property owners to share the appreciation of their equity interests in their properties such as commercial or residential real estate with investors. Property owners and investors would benefit greatly from a financial instrument that provided for such shared property ownership. The disclosed methods and systems provide cryptographically secured transactions, distributed ledger technology, and smart contracts. The use of blockchain eliminates the need of (i) intermediaries to execute transactions (self-executed by smart contracts), (ii) the need of intermediaries to keep the record of transactions and facilitate them (transactions are recorded in the ledger), (iii) solves double spending problem (eliminating potential fraud), and (iv) provides a database showing the complete history of ownership. Transactions are stored at a distributed ledger eliminating the possibility of single point failures and unresponsive servers, and the data stored on the blockchain is immutable, complete, transparent, and allows to integrate principles of management into the assets themselves. Asset tokenization through the present system can effectively reduce information asymmetry, decrease the friction to trade and democratize trading system in general, ridding the market from vast bureaucracy and red tape. Other advantages may include:

(a) Asset appreciation tokenization enhances liquidity of assets that otherwise have a very low liquidity. Real estate occupies the largest share of the global asset market and has low liquidity.

(b) It allows asset owners to capture liquidity premiums from the appreciation of assets that otherwise, due to low liquidity would not be actively traded.

(c) Tokenization enables new economic models around asset appreciation ownership, such as fractional ownership (investors can own a certain percentage of the appreciation of certain asset), thus users can purchase one cheap piece of the appreciation of an asset rather than an entire expensive asset or all of its appreciation.

(d) Tokenization through fractional ownership allows diversification of risk arising out of asset appreciation ownership (the appreciation of one wholly owned asset can decrease or lose its entire value, while fractional appreciation ownership allows diversification of risk though owning a part of the appreciation of several assets).

(e) Tokenization and ease of transactions eliminate temporal and territorial barriers for asset owners for attracting investments (the tokenized appreciation of securities can be sold globally without territorial restrictions).

(f) Asset appreciation tokenization effectively reduced entry barriers for trading and investing, by lowering the minimum payment charged for participating in the trading and, indeed, entirely new types of trading focused on trading appreciation only, not the underlying asset itself.

(g) It enables newer models of raising capital, by allowing projects that are under development to issue shares in form of tokens representing project appreciation to finance project development.

(h) Enables the use of network effects for certain products to increase their popularity in the market, by providing direct financial incentive to fractional appreciation owners (an influencer who has a fractional ownership of the appreciation of a product, is incentivized to bring further public attention to the asset).

(i) Tokenization reduces administrative expenses (excessive documentation), smart contracts execute agreements instantly (improving speed of settlements).

(j) Tokenization offers further security advantages. Fears that paper bonds are duplicates are dispelled, because tokens are unique, unable to be imitated, copied or double spent.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method comprising:
generating, by an appreciation token computer platform, an appreciation token corresponding to a value of an appreciation of an asset;
embedding or instructing a distributed ledger to embed, a smart contract into a distributed ledger block of the distributed ledger, wherein the smart contract contains terms for redeeming at least a portion of the appreciation token, wherein the distributed ledger is part of a blockchain in an external blockchain system that is external to the appreciation token computer platform;

sending, by the appreciation token computer platform to the external blockchain system, a transaction request for transfer of cryptocurrency from a first cryptocurrency wallet to a second cryptocurrency wallet; and receiving, by the appreciation token computer platform, a notification of cryptocurrency transfer, wherein an oracle embedded in the distributed ledger block is configured to send the notification of cryptocurrency transfer to the appreciation token computer platform.

2. The method of claim 1, wherein the terms include asset description, appreciation determination, appreciation calculation, payment and timing, or a combination thereof.

3. The method of claim 1, wherein the appreciation token computer platform instructs the external blockchain system to embed the smart contract into the distributed ledger block of the distributed ledger.

4. The method of claim 1, wherein the appreciation token computer platform embeds the smart contract into the distributed ledger block of the distributed ledger.

5. The method of claim 4, further comprising:

administering the blockchain by the appreciation token computer platform.

6. A computer implemented method comprising:

generating, by an appreciation token computer platform, an appreciation token corresponding to a value of an appreciation of an asset;

embedding, by a distributed ledger, a smart contract into a distributed ledger block of the distributed ledger, wherein the distributed ledger is an internal blockchain system contained within the appreciation token computer platform, wherein the smart contract contains terms for redeeming at least a portion of the appreciation token;

sending, by the appreciation token computer platform to the internal blockchain system, a first transaction request for purchase of the appreciation token;

sending, by the internal blockchain system to an external blockchain system, a second transaction request for transfer of cryptocurrency from a first cryptocurrency wallet to a second cryptocurrency wallet;

receiving, by the internal blockchain system, a notification of cryptocurrency transfer, wherein an oracle is embedded in the distributed ledger block and is configured to send the notification of cryptocurrency transfer to the internal blockchain system.

* * * * *